March 11, 1947. A. D. FERGUSON 2,417,246
VALVE MECHANISM
Filed Dec. 18, 1942
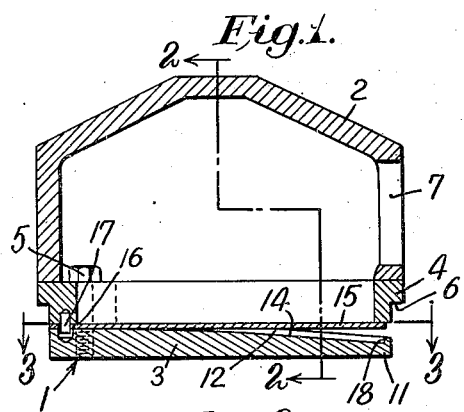
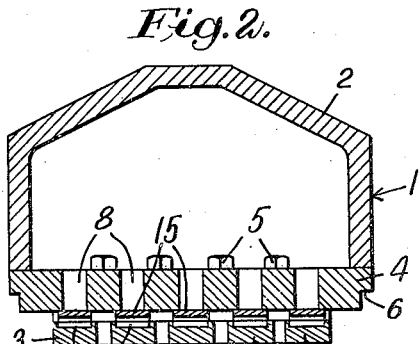
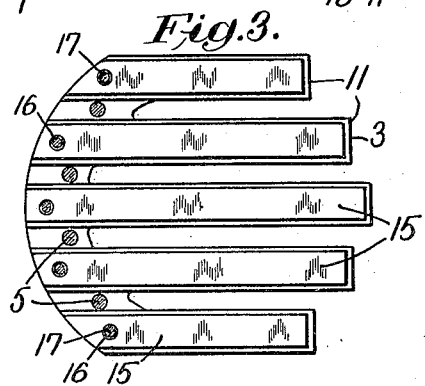
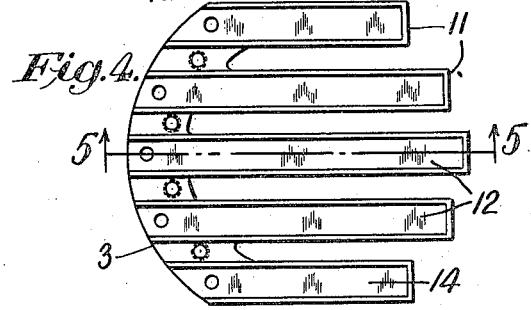
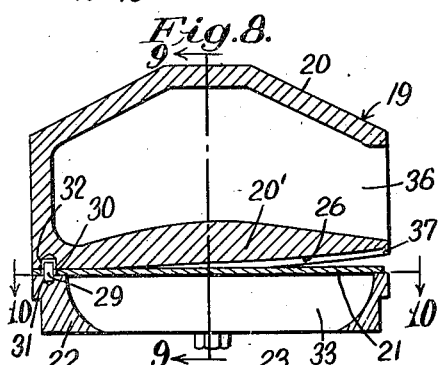
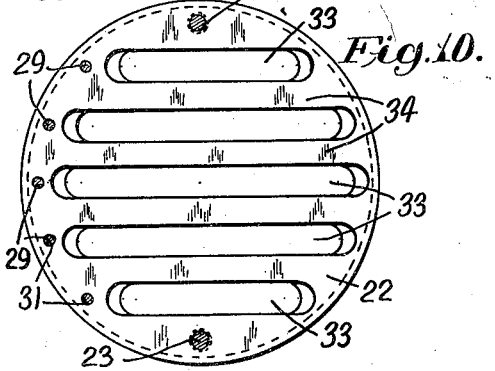
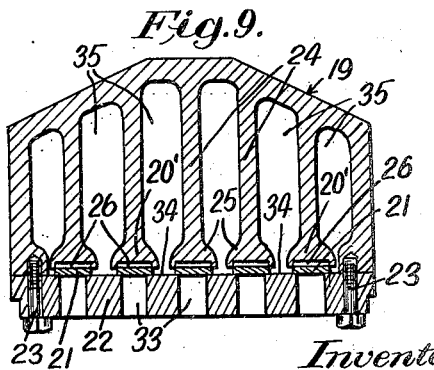
Inventor:
Alexander D. Ferguson.
by
Louis A. Maxson.
Atty.

Patented Mar. 11, 1947

2,417,246

UNITED STATES PATENT OFFICE 2,417,246

VALVE MECHANISM

Alexander D. Ferguson, Michigan City, Ind., assignor to Joy Manufacturing Company, a corporation of Pennsylvania Application December 18, 1942, Serial No. 469,432

2 Claims. (Cl. 251—119)

My invention relates to valve mechanisms, and more particularly to inlet and discharge valve mechanisms for pumps or compressors.

In valve mechanisms of the type in which a flexible valve member is supported at one of its ends and coacts with a valve seat for controlling the flow of fluid, it is desirable that means be provided for cushioning the opening movements of the valve member. It is customary to provide for a valve member of this type a valve guard having a surface curved outwardly from the held end of the valve member and adapted to be engaged by the valve member during its opening movements successively at points progressively nearer the free end of the valve member. With such prior devices, portions of the valve member may engage the guard with such force that fractures soon occur. To reduce or to cushion the impact between the valve member and the guard, it is proposed, according to the present invention, that a fluid cushioning means be provided, and in a preferred embodiment of the invention such fluid cushioning means desirably takes the form of a channel extending along the curved face of the guard and adapted to receive the valve member as it moves away from its seat. The outer end of the channel may be closed or restricted so as to prevent a free escape of fluid from the rear side of the valve member as the free end of the latter moves into the channel. In a preferred embodiment of the invention, the valve member, prior to its assembly between the valve seat and guard, may be so formed that it is curved slightly along its length in a direction opposite to the curvature of the guard surface, whereby chattering of the valve against its seat may be prevented and the resistance to opening movement of the free end of the valve member may be increased.

An object of my invention is to provide an improved valve mechanism. Another object of my invention is to provide improved cushioning means for a valve member. Still another object of the invention is to provide an improved valve member which is adapted to engage its seat without chattering. Yet another object is to provide an improved fluid cushioning means for a flexible valve member which is held at only one of its ends. Still another object is to provide an improved valve guard having a channel for receiving a valve member which is held at one of its ends, the channel being adapted to have a fluid trapped within it by the valve member for cushioning the latter. Yet a further object of the invention is to provide an improved valve mechanism having a preflexed valve element and a reversely curved guard element and having the guard element so formed that the valve element is not rigidly clamped thereby but is maintained in the desired position by reason of the formation and arrangement of the guard element and its own conformation. Other objects of the invention will appear in the course of the following description.

In the accompanying drawing in which two forms of the invention in its broader aspects have been illustrated:

Fig. 1 is a vertical sectional view through a pump inlet valve mechanism constructed in accordance with a preferred embodiment of my invention.

Fig. 2 is a sectional view taken on the planes of the line 2—2 of Fig. 1.

Fig. 3 is a view taken on the plane of the line 3—3 of Fig. 1.

Fig. 4 is a plan view of the valve guard shown in Fig. 1.

Fig. 5 is a sectional view through the valve guard taken on the plane of the line 5—5 of Fig. 4.

Fig. 6 is a plan view of one of the valve members.

Fig. 7 is a side elevational view of the valve member shown in Fig. 6.

Fig. 8 is a vertical sectional view through a pump discharge valve mechanism constructed in accordance with another embodiment of my invention.

Fig. 9 is a sectional view taken on the plane of the line 9—9 of Fig. 8.

Fig. 10 is a plan view taken on the plane of the line 10—10 of Fig. 8, showing the discharge valve seat.

In the illustrative form of the invention disclosed in Figs. 1 to 7, an inlet valve mechanism, generally designated 1, is shown. This inlet valve mechanism is shown as comprising a hollow valve cage element 2, a valve guard member 3 and a valve seat plate member 4 to which the guard member 3 may be clamped in any suitable manner, as by screws 5. The cage element as shown is not an always necessary element of the valve mechanism and may at times be replaced by other forms of valve positioning devices suited to the particular use of the valve mechanism. The valve seat plate member 4 has a peripheral shoulder 6 for determining the position of the valve mechanism relative to a suitable opening, not shown, in the cylinder head, or the like. Fluid to be pumped has access to the interior of the cage 2 through a port 1. Opening through the valve seat plate 4 are elongated slots 8 which communicate freely through their upper ends with the hollow valve cage and through which fluid flows from the interior of the cage to the cylinder bore under control of the inlet valve devices shortly to be described. The guard member 3 has fingerlike portions 11 extending beneath the lower ends of the elongated slots 8. The upper surface of the guard member 3 is curved downwardly from its end engaged by the screws 5 to its relatively free end. Formed in the upper surface of each of the fingerlike portions is a channel or groove 12 having its bottom surface 14 curving outwardly from one end to the other, as shown in Fig. 5, the curvature of the bottoms of the grooves following that of the upper surface of the guard member, and the depth of the grooves slightly exceeding, at least at the fixed end of the guard member, the thickness of the associated valves, for reasons which will shortly be explained. Non-rigidly supported between the valve seat plate member 4 and the guard member 3, as is possible because of the depths of the grooves, are strip valve members 15 adapted to engage valve seat surfaces on the lower side of the valve seat plate member, which seat surfaces surround the lower ends of the slots 8, and these strip valve members 15 are adapted to control the flow of fluid through the slots 8. Extending through an opening 16 in each of the valve members 15 at the end of the latter adjacent the screws 5, and projecting into recesses in the valve seat plate member 4 and the guard member 3 is a pin 17 which holds the valve member against substantial longitudinal movement. The openings 16 slightly exceed the diameter of the pins 17. The valves are held laterally by the side walls of the grooves 12, and because the depth of the grooves is perhaps two or three thousandths of an inch greater than the thickness of the valve stock, the valves are not pinched at their ends which are held, but have a small clearance. The width of the grooves 12 exceeds the width of the valve members 15 only sufficiently, preferably, to permit the free opening movements of the valve members. Thus the escape of air laterally past the edges of the valve from the cushioning grooves is minimized, and the air is largely displaced endwise from the grooves, and when the free ends of the valves enter the ends of the grooves which are closed as shown at 18 a very effective cushioning action will be attained. Each of the valve members, prior to assembly between the valve seat and guard, is bowed slightly so as to prevent it from curling up at its free end and to diminish chattering. The concave side of the bowed valve is towards the seat, and while the valves are not pinched at their ends traversed by the pins 17 the tendency of the valves to flex removes all loose play and the conformation of the bottoms 14 of the grooves 12 avoids any substantial bowing of the valves away from their seats, even at their central portions. Of course during compression the valves will be held tightly closed by reason of the pressure of the fluid within the cylinder.

From the foregoing description it will be apparent that the inlet valve mechanism chosen for purposes of illustration is very simple in construction and effective in operation. The valve is not pinched rigidly between the bottoms of the grooves and the lower surface of the valve seat plate member. Minor variations in stock thickness are harmless. Due to the normal flexure of the valve members 15 and the conformation of the surfaces 14 of the grooves 12, the valves are maintained in a satisfactory closed condition, and their opening movements are more effectively cushioned by the inherent resilience of the valve stock, even without the cushioning action provided by the grooves in the guard member; and the guard member grooves provide a cushion action which is most effective because of the controlled escape of the fluid from behind the valves as they open and because of the supplemental stronger cushioning action when the outermost ends of the valves enter the closed ends of the grooves. Under some circumstances the closure of the ends of the grooves may be unnecessary, but I prefer it under ordinary circumstances.

In Figs. 8 to 10 there is shown a discharge valve mechanism generally designated 19. In this form of the invention a cage member 20 is shown as formed integral with a guard member, the portion of the cage member constituting the guard member being designated 20'. Here the valve mechanism comprises, in addition to valve elements 21, in desired number, a valve seat plate 22 adapted to be clamped by suitable holding means, as machine screws 23, to the cage member 20, and to be held by the latter in suitable cooperative relationship with an opening into a pump cylinder not shown. The cage member 20 will be noted to be hollow interiorly and to be provided with a number of parallel partitionlike portions 24, each widened out at its free extremity as at 25 and provided in its lower face as viewed in Figs. 8 and 9 with a valve receiving and cushioning groove 26. The lower ends of the several partition elements 24 are curved, and the grooves 26 correspond substantially in curvature for at least a substantial distance from the outer ends of the grooves with the lower surfaces of the portions 25. The depth of the grooves 26 slightly exceeds the thickness of the stock of the strip valve elements 21 which are received, one in each of the several grooves, and the valves are held in position against escape from the grooves by pins 29 extending through openings 30 in the valves and entering recesses 31 and 32 respectively in the seat member 22 and in the cage member 20. The valve members 21 in this embodiment of the invention are, when reposing freely on the surface of the seat member 22—that is when the cage member is not clamped to the seat member—slightly bowed downwardly at their ends and upwardly at their middle. Accordingly, when the seat and cage members are clamped together, the valves will possess increased resistance to opening flexure, and be held resiliently against chattering action. The valve seat member 22 is traversed by ports 33, one beneath each valve, these ports extending parallel to each other and beneath the portions 25 of the partitions 24. The upper ends of the ports 33 are surrounded by valve seat surfaces 34 with which the valve elements cooperate. The spaces 35 between the partition portions 24 and between these portions and the side of the side walls of the cage 20 communicate endwise as at 36 with the discharge space of the pump mechanism with which this valve device is used. This is also true of the spaces between the ends of the grooves 26 and the valve seat member 22.

In this form of the invention, as in the form first described, it will be understood that an improved arrangement possessing freedom from chattering of the valves, but yet capable of use with valves varying slightly in thickness, a device in which effective sealing of the ports is accomplished, but in which, through the countercurvature of the valve elements, an increased yielding resistance to opening movement is provided; and a device in which most effective cushioning of the valve elements by the fluid being pumped is effected. The ends of the grooves 26 may desirably be closed as at 37 in a manner similar to that in which the grooves 12 in the first form are closed at their outer ends 18.

In both forms of the invention then it will be evident that a simple, inexpensive, durable and highly effective valve mechanism is provided. The parts will be precision made with seats, guards and cages hardened to prevent wear. The guide channels and radii on the cages and guards may be cam milled and ground. The valve seats may be drop forgings, gang milled, case hardened and ground, and the valves may be made of various materials to suit demands. Accordingly, constructions adapted to modern methods of manufacture and which may be relatively inexpensively produced and which will be highly durable in use and effective in their valving functions are made available by this invention.

While there are shown in this application two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a valve mechanism, in combination, means providing a port, a valve seat surrounding said port, a bowed flexible valve member having its concave side cooperating with said valve seat for controlling the flow of fluid through said port, means for loosely holding one end of said valve member, a guard member for limiting the opening movement of said valve member, a channel of substantially uniform depth formed in said guard member and having a bottom surface curving outwardly from the held end of said valve member, said channel providing a close fit for said valve member on opening movements of the latter, and means for restricting the escape of fluid from the outer end of said channel on receiving said valve member whereby a fluid cushion is provided for the latter.

2. In a valve mechanism, in combination, a valve plate having an opening therein, a valve seat on said valve plate surrounding said opening, an elongated flexible plate-type valve member cooperating with said valve seat for controlling the flow of fluid through said opening, means for holding one end of said valve member, a guard member for limiting the opening movement of said valve member, a channel of substantially uniform depth formed in said guard member for receiving snugly said valve member and having a bottom surface curving from its end adjacent the held end of said valve member away from said valve plate and engageable by said valve member, said guard member being so arranged that the free end of said valve member moves completely out of said channel to engage said valve seat, and means for closing the outer end of said channel whereby fluid is trapped in the latter by said valve member as its free end moves into said channel.

ALEXANDER D. FERGUSON.

REFERENCES CITED

The following references are of record in the file of this patent:

UNITED STATES PATENTS

| Number | Name | Date |
| --- | --- | --- |
| 2,199,482 | Christensen | May 7, 1940 |
| 2,151,746 | Cody | Mar. 28, 1939 |
| 2,302,447 | King | Nov. 17, 1942 |
| 2,095,842 | Steenstrup | Oct. 12, 1937 |
| 2,065,062 | Dugelay | Dec. 22, 1936 |
| 2,040,542 | Baker | May 12, 1936 |
| 1,998,444 | Clap | Apr. 23, 1935 |
| 797,739 | Meer | Aug. 22, 1905 |